US011906384B2

(12) United States Patent
Kaneda et al.

(10) Patent No.: US 11,906,384 B2
(45) Date of Patent: Feb. 20, 2024

(54) PRESSURE DETECTION DEVICE WITH IMPROVED LOAD AND RESPONSE ACCURACY

(71) Applicant: Wacom Co., Ltd., Saitama (JP)

(72) Inventors: Takenori Kaneda, Saitama (JP); Kenichi Ninomiya, Saitama (JP); Kohei Tanaka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 622 days.

(21) Appl. No.: 17/111,327

(22) Filed: Dec. 3, 2020

(65) Prior Publication Data

US 2021/0088398 A1 Mar. 25, 2021

Related U.S. Application Data

(63) Continuation of application No. PCT/JP2019/015246, filed on Apr. 8, 2019.

(30) Foreign Application Priority Data

Jun. 28, 2018 (JP) .................................. 2018-122795

(51) Int. Cl.
  *G01L 9/00* (2006.01)
  *G01L 5/1623* (2020.01)
  *G06F 3/041* (2006.01)

(52) U.S. Cl.
  CPC .......... *G01L 9/0072* (2013.01); *G01L 5/1623* (2020.01); *G06F 3/0412* (2013.01)

(58) Field of Classification Search
  None
  See application file for complete search history.

(56) References Cited

U.S. PATENT DOCUMENTS

| 5,206,785 A | 4/1993 | Hukashima |
| 7,938,025 B2 * | 5/2011 | Shimomoto ........... A61B 5/021 |
| | | 73/862.626 |

(Continued)

FOREIGN PATENT DOCUMENTS

| CN | 101751156 A | 6/2010 |
| CN | 107656630 A | 2/2018 |

(Continued)

OTHER PUBLICATIONS

International Search Report, dated Jun. 25, 2019, for International Application No. PCT/JP2019/015246, 2 pages.

(Continued)

*Primary Examiner* — Brandi N Hopkins
*Assistant Examiner* — Nigel H Plumb
(74) *Attorney, Agent, or Firm* — Seed IP Law Group LLP

(57) ABSTRACT

A pressure detection element of a capacitive system includes a dielectric having two opposing surfaces including a first surface and a second surface, a conductor layer provided on the first surface of the dielectric, a conductive elastic member provided on the second surface of the dielectric, a spacer that positions the conductive elastic member at a predetermined distance from the second surface of the dielectric, and a pressing member configured to push the conductive elastic member toward the dielectric. An end surface of the pressing member that presses the conductive elastic member has a predetermined curvature, with an apex at a center of the end surface. A protrusion is provided at the apex at the center of the end surface of the pressing member.

8 Claims, 7 Drawing Sheets

(56) References Cited

U.S. PATENT DOCUMENTS

| | | | |
|---|---|---|---|
| 2009/0114459 A1* | 5/2009 | Fukushima | G06F 3/03545 178/19.03 |
| 2011/0219892 A1 | 9/2011 | Fukushima et al. | |
| 2018/0024657 A1 | 1/2018 | Ninomiya et al. | |
| 2018/0101272 A1* | 4/2018 | Xi | G06F 3/042 |

FOREIGN PATENT DOCUMENTS

| | | |
|---|---|---|
| JP | 4-96212 A | 3/1992 |
| JP | 2009-130135 A | 6/2009 |
| JP | 2011-186803 A | 9/2011 |

OTHER PUBLICATIONS

Chinese Office Action, dated May 7, 2022, for Chinese Application No. 201980038359.9, 12 pages (with English translation).

* cited by examiner 7b (RADIUS OF CURVATURE 8 cm (R8))

7c (RADIUS OF CURVATURE 0.4 cm (R0.4))

PRESSURE DETECTION DEVICE WITH IMPROVED LOAD AND RESPONSE ACCURACY

BACKGROUND

Technical Field of the Disclosure

The disclosure relates to a pressure detection element in which a capacity value changes according to pressure or displacement applied from the outside.

Background Art

A position detection apparatus and a position indicator are used as one of input devices of various electronic devices, such as a personal computer, a high-performance phone terminal called a smartphone, and a tablet personal computer (PC). The position indicator is generally formed in a pen shape and is called an electronic pen or a stylus. The position indicator can be brought into contact and moved on an operation surface of the position detection apparatus to thereby input characters or figures or indicate a target position on the operation surface. The position indicator is provided with a pressure detection element for pen pressure detection in order to detect a case in which the position indicator is in contact with the operation surface of the position detection apparatus. In the past, a pressure detection element (variable capacitor) of a capacitive system as disclosed in Japanese Patent Laid-Open No. Hei 4-96212 (hereinafter, referred to as Patent Document 1) has been used as the pressure detection element.

FIGS. 6A and 6B illustrate a configuration example of the pressure detection element disclosed in Patent Document 1. A pressure detection element 200 illustrated in FIGS. 6A and 6B includes a substantially disc-shaped dielectric 201, a first electrode 202 attached to one surface 201a of the dielectric 201, and a second electrode 203 arranged on another surface 201b side of the dielectric 201 facing the one surface 201a. The second electrode 203 is flexible and is arranged on the other surface 201b side of the dielectric 201 through a ring-shaped spacer 204. A rod-shaped core 210 is provided on an opposite side of the dielectric 201 in the second electrode 203 through an elastic body 205.

A first terminal 206 including a disc-shaped flange portion 206a and a lead portion 206b extending from substantially a center of one surface of the flange portion 206a is provided on one surface side of the first electrode 202. A second terminal 207 including a disc-shaped flange portion 207a and a lead portion 207b extending from substantially a center of one surface of the flange portion 207a is provided on an end portion of the second electrode 203. The capacitance generated between the first electrode 202 and the second electrode 203 can be detected through the first terminal 206 and the second terminal 207.

In a state (initial state) in which pressure or displacement is not applied to the core 210 at all, the spacer 204 forms a slight gap between the other surface 201b of the dielectric 201 and the second electrode 203 in the pressure detection element 200 as illustrated in FIG. 6A. A capacity value (capacitance) in this case is very small or zero. As illustrated in FIG. 6B, when pressure is applied to the core 210, the elastic body 205 and the second electrode 203 are pressed against the core 210 and elastically deformed. As a result, the second electrode 203 is brought into contact with the other surface 201b of the dielectric 201. When a contact area of the second electrode 203 and the other surface 201b of the dielectric 201 increases, the capacitance value between the first and second terminals 206 and 207 increases. As a result, the change in the capacitance value between the first and second terminals 206 and 207 can be detected to detect the pressure (pen pressure) applied to the core 210.

Various improvements are made to the pressure detection element. For example, in a pressure detection element disclosed in Japanese Patent Laid-Open No. 2009-130135 (hereinafter, referred to as Patent Document 2), a conductive elastic member including a protrusion at a tip of a hemispherical end portion is used as a second electrode to allow detecting slight pressure. In a pressure detection element disclosed in Japanese Patent Laid-Open No. 2011-186803 (hereinafter, referred to as Patent Document 3), when the pressure is released by using urging force of a spring, a conductive elastic member used as a second electrode is quickly separated from a dielectric to return to the initial state.

In the pressure detection element used in the position indicator, it is required that (1) slight pressure (pen pressure) can be detected, (2) a change in pressure can appropriately be followed, and (3) there is a resemblance between the change when the pressure is applied and the change when the pressure is released. In other words, (1) means that on-load characteristics are excellent, (2) means that response characteristics are excellent, and (3) means that hysteresis characteristics are excellent. Further, (1) the on-load characteristics and (2) the response characteristics are in a trade-off relationship that one needs to be sacrificed to purse the other as can be understood by comparing the pressure detection element described in Patent Document 2 and the pressure detection element described in Patent Document 3.

That is, as in the case of the pressure detection element described in Patent Document 3, there is a case of using the core 210 in which a pressing end surface pressing the elastic body 205 is closer to a plane as illustrated, for example, in FIG. 7A. The area of the elastic body 205 in contact with the pressing end surface becomes large. In this case, since restoring force of the elastic body 205 acts in the range of contact, large restoring force is obtained, and the responsiveness is improved. However, the elastic body 205 as a whole is pushed up by the core 210. Therefore, large force is necessary to deform the elastic body 205, and the on-load characteristics are deteriorated.

On the other hand, as in the case of the pressure detection element described in Patent Document 2, there is a case of using a core 210A in which the pressing end surface pressing the elastic body 205 is formed in a hemispherical shape with a short radius of curvature as illustrated, for example, in FIG. 7B. This is a case in which the pressing end surface has a sharper shape. In this case, the elastic body 205 can be deformed with relatively small pressure in a narrow range, and the on-load characteristics are improved. However, the restoring force of the elastic body 205 is generated only in the deformed range, and the response characteristics are deteriorated.

The techniques disclosure in Patent Documents 2 and 3 are useful techniques, and the techniques are applied and used in various position indicators. On the other hand, along with the improved performance of electronic devices and position detection apparatuses, there is also a demand for further improvement in the performance of position indicators. For example, even when a tapping operation of gently striking the operation surface of the position detection apparatus is repeated, it is desirable that the position indicator can correctly detect and report the pen pressure to allow the position detection apparatus side to correctly recognize the tapping operation. That is, it is desirable to realize a pressure detection element with favorable on-load characteristics, response characteristics, and hysteresis characteristics.

BRIEF SUMMARY

In view of the above, it is desirable to provide a highly reliable pressure detection element with improved on-load characteristics, response characteristics, and hysteresis characteristics, suitable for use in a position indicator.

To solve the problem, provided is a pressure detection element of a capacitive system, the pressure detection element including: a dielectric having two opposing surfaces including a first surface and a second surface, a conductor layer provided on the first surface of the dielectric, a conductive elastic member provided on the second surface of the dielectric, a spacer that positions the conductive elastic member at a predetermined distance from the second surface of the dielectric, and a pressing member configured to push the conductive elastic member toward the dielectric, in which an end surface of the pressing member that presses the conductive elastic member has a predetermined curvature, with an apex at a center of the end surface, and a protrusion is provided at the apex at the center of the end surface of the pressing member.

According to the pressure detection element, the conductor layer is provided on the first surface of the dielectric, the conductive elastic member is provided on the second surface through the spacer, and the pressing member can push the conductive elastic member toward the dielectric. This provides a variable capacitor including the dielectric between the conductor layer and the conductive elastic member. The pressure applied by the pressing member can be detected according to the capacitance generated between the conductor layer and the conductive elastic member that varies depending on the contact condition of the conductive elastic member with respect to the dielectric. The end surface of the pressing member that presses the conductive elastic member is a roundish flat surface with predetermined curvature, with the apex at the center of the end surface. The protrusion is further provided at the apex of the end surface.

As a result, when the pressing member is pressed toward the conductive elastic member, the protrusion at the apex presses the conductive elastic member to bring the conductive elastic member into contact with the second surface of the dielectric. Therefore, pen pressure can be detected with slight pressure (improvement of on-load characteristics). When the pressure is further applied, a large part of the end surface of the pressing member comes into contact with the conductive elastic member to press the conductive elastic member to bring the conductive elastic member into contact with the second surface of the dielectric. As a result, the pressure applied to the pressing member can appropriately be detected according to the state of the pressure.

When the pressure applied to the pressing member is removed, a restoring force is generated in the entire conductive elastic member because the contact area of the pressing member and the conductive elastic member is large so that the conductive elastic member is distorted as a whole. The conductive elastic member can exert a large restoring force and can quickly return to the initial state (improvement of response characteristics). The processes of deformation of the conductive elastic member during the application of the pressure and during the release of the pressure resemble in the opposite direction, and the detected changes in the pressure resemble (improvement of hysteresis characteristics). This can realize a highly reliable pressure detection element with favorable on-load characteristics, response characteristics, and hysteresis characteristics.

DETAILED DESCRIPTION

A pressure detection element according to an embodiment of the disclosure will now be described with reference to the drawings. In an example of a case of the embodiment described below, the pressure detection element according to the disclosure is used for pen pressure detection of an electronic pen used as a position indicator for a position detection apparatus. Note that systems of the position detection apparatus and the position indicator (electronic pen) include an electromagnetic resonance system (electro magnetic resonance technology (EMR) system) and an active capacitive coupling system (active electrostatic (AES) system).

In the electro magnetic resonance system, the position detection apparatus includes a sensor provided with a plurality of loop coils in each of an X-axis direction and a Y-axis direction. A transmission period in which power is sequentially supplied to the plurality of loop coils of the sensor unit to generate a magnetic field and a reception period in which the supply of power is stopped to receive a magnetic field from the outside are alternately provided. The corresponding electronic pen includes a resonant circuit including a coil and a capacitor. A signal is generated by a flow of current in the coil according to the magnetic field from the sensor, and the electronic pen transmits the signal to the position detection sensor after including pen pressure information in the signal. The position detection apparatus receives the signal in the reception period to detect the indicated position and the pen pressure of the electronic pen.

In the case of the active capacitive coupling system, the electronic pen transmits a signal from the oscillation circuit mounted on the electronic pen after including the pen pressure information in the signal, and the position detection apparatus receives the signal to detect the indicated position and the pen pressure. The pressure detection element of the disclosure can be used for the pen pressure detection of the electronic pen of the electro magnetic resonance system and for the pen pressure detection of the electronic pen of the active capacitive coupling system. In the embodiment described below, an example of a case of using the pressure detection element in the electronic pen of the electro magnetic resonance system (EMR system) will be described.

Figure 1:
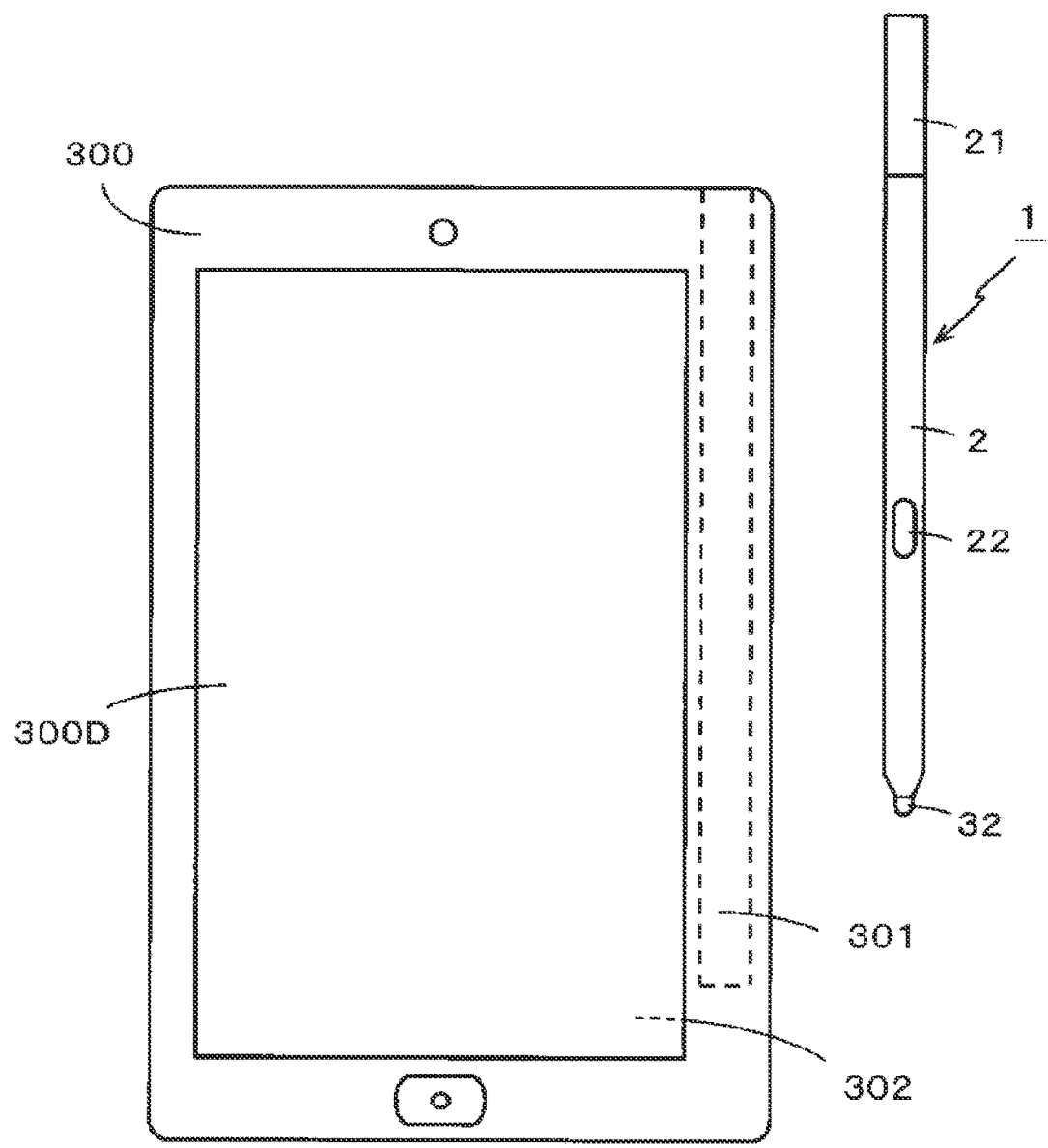
FIG. 1 is a diagram for describing an example of an appearance of an electronic pen according to an embodiment of a pressure detection element of the disclosure and an example of an appearance of an electronic device in which the electronic pen is used.

Example of Appearance of Electronic Pen Provided with Pressure Detection Element and Electronic Device FIG. 1 is a diagram for describing an example of an appearance of an electronic pen according to the embodiment of the pressure detection element of the disclosure and an example of an appearance of an electronic device in which the electronic pen is used. The electronic device 300 of the example is a high-performance mobile phone terminal provided with a display apparatus, such as a liquid crystal display (LCD), including a relatively large display screen 300D. A position detection apparatus 302 of the electro magnetic resonance system including a position detection sensor corresponding to the entire surface of the display screen 300D is included in a housing of the electronic device 300.

The housing of the electronic device 300 includes a housing recessed hole 301 for housing an electronic pen 1. The user takes out the electronic pen 1 housed in the housing recessed hole 301 from the electronic device 300 as necessary and uses the display screen 300D as an input surface (operation surface) to perform a position indication operation. In the electronic device 300, when the position indication operation is performed by the electronic pen 1 on the display screen 300D, the position detection apparatus 302 including the position detection sensor corresponding to the display screen 300D detects the position and the pen pressure of the operation on the electronic pen 1. A microcomputer included in the position detection apparatus 302 of the electronic device 300 performs a display process corresponding to the operation position and the pen pressure on the display screen 300D.

In the electronic pen 1, a plurality of parts of the electronic pen 1 are lined up and housed in an axial direction in a hollow portion of a cylindrical case (housing) 2 made of, for example, a resin. One end side of the cylindrical case has a tapered shape, and an opening (not illustrated in FIG. 1) is provided on an end portion of the one end side. A tip portion 32 of a rod-shaped core 3 described later is exposed as a nib through the opening. A case cap 21 is fitted to an opposite side of the nib side of the case 2 to block the case 2 to secure the sealing in consideration of water resistance and dust resistance.

A pressing operator 22 for side switch is provided on the case 2 of the electronic pen 1 so that a side switch placed on a printed circuit board through a through hole can be pressed. A pressing operation of the side switch using the pressing operator 22 can be allocated and set as an operation similar to a click operation using a pointing device, such as a mouse, on the electronic device 300 side including the position detection apparatus 302.

Internal Configuration of Electronic Pen

Figure 2:
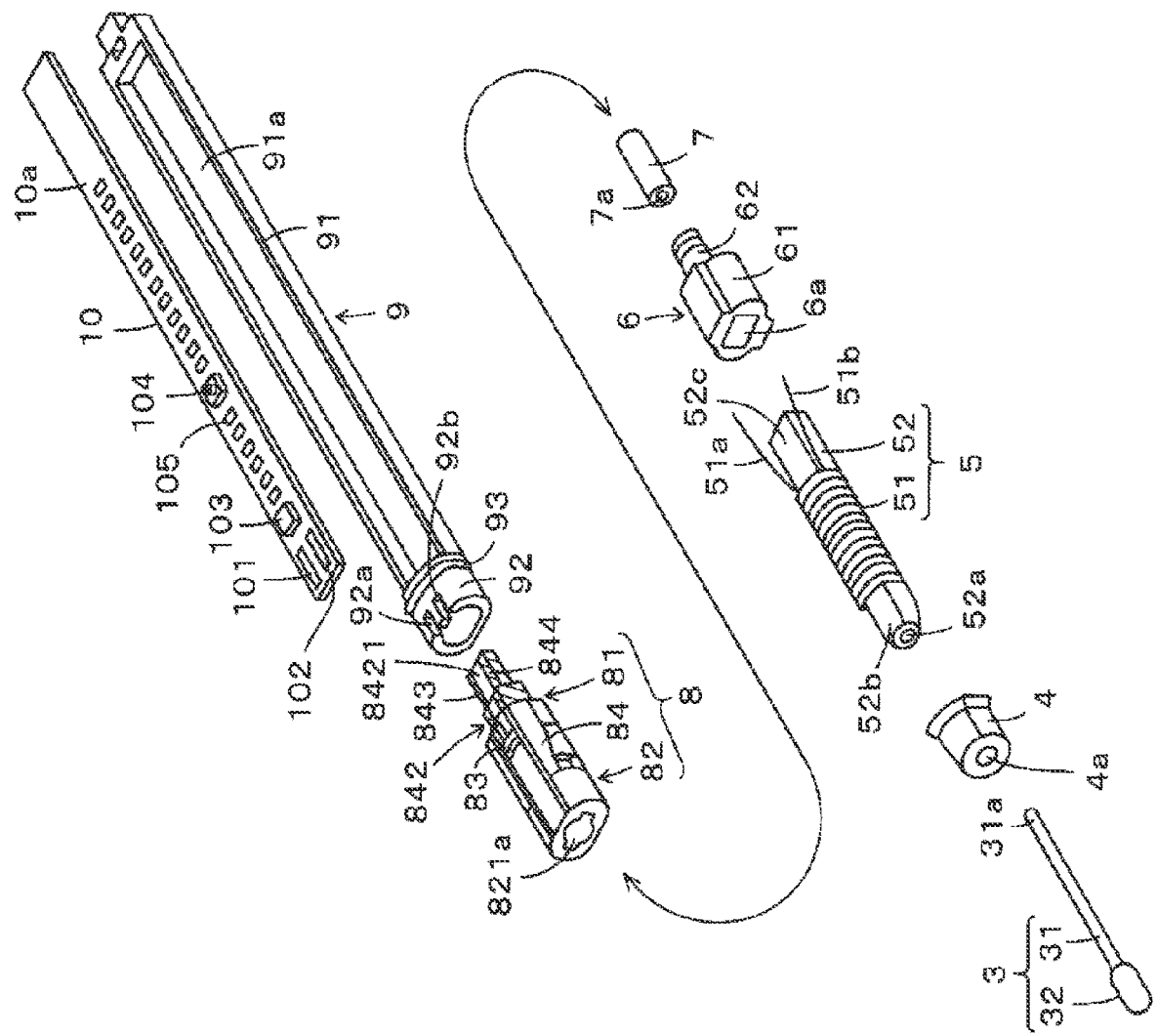
FIG. 2 is an exploded perspective view for describing an internal configuration example of the electronic pen according to the embodiment of the pressure detection element of the disclosure.

FIG. 2 is an exploded perspective view for describing an internal configuration example of the electronic pen 1 according to the embodiment of the pressure detection element of the disclosure. As illustrated in FIG. 2, a cap member 4, a coil member 5, a coil member holder 6, a pressing member 7, a pen pressure detection module 8, and a board holder 9 are arranged in this order from the nib side in the hollow portion of the case 2, in the axial direction of the case 2. A printed circuit board 10 is housed and locked in a board housing portion 91 of the board holder 9. The printed circuit board 10 is an example of a circuit board.

The core 3 includes a core body portion 31 and the tip portion 32 as a nib. In a state in which all of the parts are housed in the hollow portion of the case 2, the core body portion 31 is inserted from an opening closer to the nib of the case 2 and is engaged with the pressing member 7 provided on the pen pressure detection module 8 to attach the core 3. To allow the core 3 to transmit the pressure (pen pressure) applied to the tip portion 32 to a pressure sensing portion 83 of a pen pressure detection portion 81, the core 3 is made of a resin, such as polycarbonate, a synthetic resin, and an acrylonitrile-butadiene-styrene (ABS) resin, as an example of a hard non-conductive material. The core 3 can be inserted into and removed from the electronic pen 1.

The coil member 5 includes a coil 51 and a magnetic core, which is a ferrite core 52 in the example, around which the coil 51 is wound. The ferrite core 52 of the coil member 5 has, at a central axis position, a pillar shape including a through hole 52a with a diameter slightly larger than a diameter of the core body portion 31 in order to insert the core body portion 31 of the rod-shaped core 3. The ferrite core 52 in the embodiment has a flat cross section shape corresponding to the cross section shape of the hollow portion of the case 2, and on the nib side, the ferrite core 52 includes a tapered portion 52b narrowing toward the end. Note that the tip portion 32 of the core 3 has a diameter slightly larger than the diameter of the core body portion 31.

The cap member 4 is provided on the tapered portion 52b side of the ferrite core 52 that is the nib side of the electronic pen. The cap member 4 is made of an elastic material, such as elastic rubber. The cap member 4 has a cap shape so as to cover the nib side of the ferrite core 52 and includes an opening (through hole) 4a for inserting the core body portion 31 of the core 3. A diameter of the opening 4a is larger than the diameter of the through hole 52a of the ferrite core 52 in the example. The appearance of the cap member 4 in the example is a flared skirt shape as illustrated in FIG. 2.

The coil member holder 6 is provided on an end portion side of the ferrite core 52, on an opposite side of the tapered portion 52b that is the nib side of the electronic pen. The coil member holder 6 is made of an elastic material, such as elastic rubber. The end portion of the ferrite core 52 on the opposite side of the tapered portion 52b that is the nib side of the electronic pen is a coil non-winding portion 52c around which the coil 51 is not wound. The coil member holder 6 includes a fitting portion 61 provided with a recessed hole 61a for fitting and housing the coil non-winding portion 52c of the ferrite core 52 and includes a protruding portion 62 pressed and fitted to a hollow portion 821a of a pen pressure transmission member 82 described later of the pen pressure detection module 8.

A through hole 62a (not illustrated) into which the core body portion 31 of the core 3 is inserted is formed on the protruding portion 62 of the coil member holder 6. The through hole 62a of the protruding portion 62 is in communication with the recessed hole 61a (not illustrated) of the fitting portion 61.

In the state in which the coil non-winding portion 52c of the ferrite core 52 of the coil member 5 is fitted to the fitting portion 61 of the coil member holder 6, a hollow space for inserting the core body portion 31 of the core 3 is formed through the coil member 5 and the coil member holder 6 because the through hole 52a into which the core body portion 31 of the core 3 is inserted is formed on the ferrite core 52.

The pressing member 7 provided on the protruding portion 62 side of the coil member holder 6 includes a fitting recessed hole 7a to which an end portion 31a of the core body portion 31 of the core 3 is pressed and fitted. An outer diameter of the pressing member 7 is selected to be larger than the through hole 62a of the protruding portion 62 of the coil member holder 6. Therefore, the core body portion 31 of the core 3 is inserted into the ferrite core 52 and into the fitting portion 61 and the protruding portion 62 of the coil member holder 6. When the end portion 31a is fitted to the pressing member 7 while the end portion 31a is projected toward the pressing member 7, the core 3 does not fall out due to the existence of the pressing member 7. However, the core 3 is pressed into the fitting recessed hole 7a of the pressing member 7, and therefore, the core 3 can be pulled out. That is, the core 3 can be replaced.

The pen pressure detection module 8 is provided by engaging and combining the pen pressure detection portion 81 and the pen pressure transmission member 82 in the embodiment. The pen pressure detection portion 81 includes the pressure sensing portion 83 including a plurality of pressure sensing parts, and a holder 84 that holds the pressure sensing portion 83 and that has a function for electrical connection. The holder 84 is made of an insulating material, such as a resin. The holder 84 includes a unit including a holding portion 841 illustrated in FIG. 3 described later that holds the pressure sensing portion 83, and a connection portion 842 illustrated in FIG. 3 described later for electrically connecting two electrodes included in the pressure sensing portion 83 held by the holding portion 841 to the printed circuit board 10 housed in the board holder 9.

The pen pressure transmission member 82 is engaged with the holding portion 841 of the holder 84 of the pen pressure detection portion 81 to cause the holding portion 841 of the holder 84 to hold the plurality of pressure sensing parts of the pressure sensing portion 83. The pen pressure transmission member 82 also includes the hollow portion 821a illustrated in FIG. 3 described later to which the protruding portion 62 of the coil member holder 6 is pressed and fitted as described above. The protruding portion 62 of the coil member holder 6 is pressed and fitted to combine the pen pressure detection module 8 and the coil member 5.

The board holder 9 is made of an insulating material, such as a resin, and the board holder 9 includes the board housing portion 91 and a fitting portion 92 to be fitted to the holder 84 of the pen pressure detection portion 81 of the pen pressure detection module 8. The board housing portion 91 of the board holder 9 is formed in a box shaped without a lid. A longitudinal direction of the printed circuit board 10 with an elongated rectangular shape is brought into line with the axial direction of the electronic pen 1 to house the printed circuit board 10 in a recessed portion 91a of the board housing portion 91. In the case of the example, a depth of the recessed portion 91a of the board housing portion 91 is substantially equal to a thickness of the printed circuit board 10.

The fitting portion 92 of the board holder 9 has a cylindrical shape in the present embodiment including a hollow portion into which the connection portion 842 of the holder 84 of the pen pressure detection portion 81 of the pen pressure detection module 8 is inserted. Conductor patterns 101 and 102 positioned and formed to be electrically connected to two terminal members 843 and 844 connected to two electrodes of the pressure sensing portion 83 in the connection portion 842 of the holder 84 of the pen pressure detection portion 81 are formed on the printed circuit board 10. Various circuit parts, such as capacitors 103 and 105 and a side switch 104, are also mounted on the printed circuit board 10.

When the connection portion 842 of the holder 84 of the pen pressure detection module 8 is inserted into the fitting portion 92 of the board holder 9, the connection portion 842 is brought into contact and engaged with an upper surface (board surface) 10a of the printed circuit board 10 housed in the board housing portion 91 of the board holder 9. In this way, two electrodes of the pressure sensing portion 83 held by the pen pressure detection portion 81 and the conductor patterns 101 and 102 formed on the board surface 10a of the printed circuit board 10 are brought into contact and electrically connected through two terminal members 843 and 844 of the connection portion 842 as a result of the fitting and combining of the pen pressure detection portion 81 of the pen pressure detection module 8 with the board holder 9 and the printed circuit board 10. In the embodiment, the part is soldered to make the electrical connection firmer.

Note that the board holder 9 cannot move in the application direction of the pen pressure applied to the core 3 due to the case cap 21. Therefore, when the pen pressure detection module 8 is fitted to the board holder 9, the movement of the pen pressure detection module 8 in the axial direction is prevented in the case 2 of the electronic pen 1. As a result, the pen pressure detection portion 81 can surely detect the pen pressure applied to the core.

Fitting grooves 92a and 92b for firm fitting and connection to the pen pressure detection module 8 are provided on the fitting portion 92 of the board holder 9. A sealing member 93 provided on the fitting portion 92 of the board holder 9 is a member for closing a gap between the board holder 9 and an inner wall of the hollow portion of the case 2 when the board holder 9 is housed in the case 2, and the sealing member 93 is an elastic body, such as a ring-shaped member made of rubber.

Configuration Example of Pen Pressure Detection Module

Figure 3:
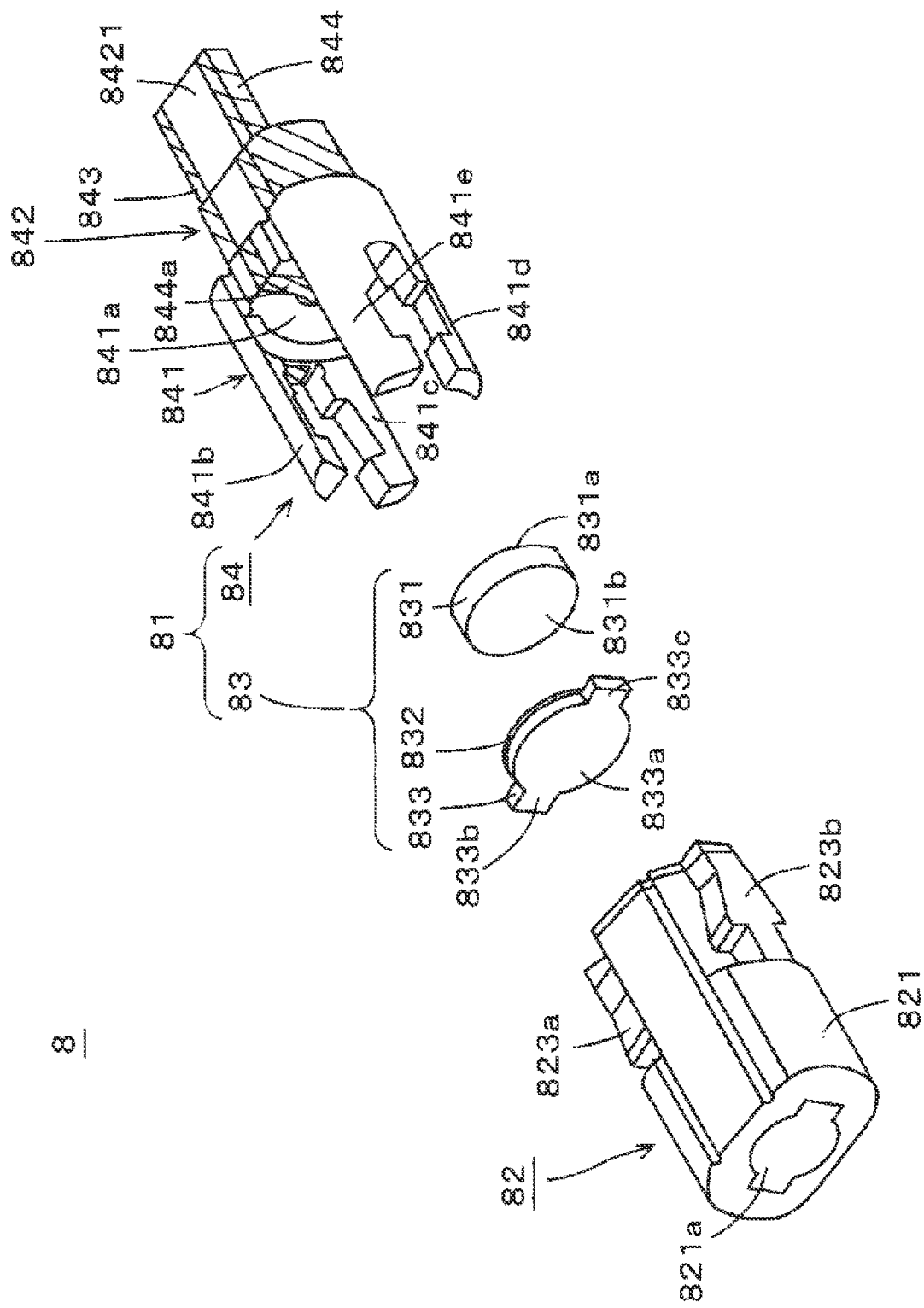
FIG. 3 is an exploded perspective view for describing a configuration example of a pen pressure detection module of the electronic pen according to the embodiment of the pressure detection element of the disclosure.

FIG. 3 is an exploded perspective view for describing a configuration example of the pen pressure detection module 8 of the electronic pen 1 according to the embodiment of the pressure detection element of the disclosure. The pressure sensing portion 83 of the pen pressure detection portion 81 includes a dielectric 831, a spacer 832, and a conductive elastic member 833 as illustrated in FIG. 3. The dielectric 831 has, for example, a substantially disk shape and includes one round surface 831a and another round surface 831b facing each other. A round conductor layer 834 is formed on the one surface 831a of the dielectric 831. The conductor layer 834 provides a first electrode of a variable capacitor as the pressure sensing portion 83 in the example. Note that the conductor layer 834 is formed on the one surface 831a of the dielectric 831, and therefore, the conductor layer 834 does not appear in FIG. 3.

The spacer 832 is made of an insulating material, and the spacer 832 is a ring-shaped (annular) thin plate-like body, an outer diameter of which is the same as a diameter of the dielectric 831. The conductive elastic member 833 is made of conductive elastic rubber in the example. The conductive elastic member 833 of the example has a shape including two projecting portions 833b and 833c formed on a periphery of a disk-shaped thin plate like body 833a, an outer diameter of which is the same as the diameter of the dielectric 831. The spacer 832 is, for example, bonded to the plate-like body 833a of the conductive elastic member 833.

The conductive elastic member 833 is placed on the other surface 831b side of the dielectric 831 through the spacer 832 to provide a variable capacitor as the pressure sensing portion 83 of the example. The variable capacitor as the pressure sensing portion 83 of the example includes the first electrode including the conductor layer 834 formed on the one surface 831a of the dielectric 831 and a second electrode including the conductive elastic member 833.

The holder 84 of the pen pressure detection portion 81 includes a unit of the holding portion 841 and the connection portion 842 as, for example, injection molded parts made of a resin. The connection portion 842 of the holder 84 of the pen pressure detection portion 81 includes a plate-shaped projecting portion 8421 projecting in a direction parallel to the board surface 10a of the printed circuit board 10. The plane of the projecting portion 8421 is provided to just come into contact with the board surface 10a when the pen pressure detection module 8 is fitted to the board holder 9 and engaged with the printed circuit board 10.

In the embodiment, two terminal members 843 and 844 (illustrated with diagonal lines in FIGS. 2 and 3) are formed as conductive fine three-dimensional patterns on the holder 84 from the holding portion 841 to the connection portion 842 in the direction of the application of the pen pressure, that is, in the axial direction of the electronic pen 1. As a result, the terminal members 843 and 844 are integrated with the holder 84. Nickel plating layers are formed on the surfaces of the terminal members 843 and 844 formed as fine three-dimensional patterns in order to facilitate the electrical connection through contact, and gold plating layers are further formed on the nickel plating layers.

The holding portion 841 of the holder 84 of the pen pressure detection portion 81 includes a recessed portion 841a that houses the pressure sensing portion 83 including the dielectric 831, the spacer 832, and the conductive elastic member 833 combined together. The holding portion 841 further includes engagement protruding portions 841b, 841c, 841d, and 841e projecting from the recessed portion 841a toward the pen pressure transmission member 82 (toward the core 3) in the axial direction. One end portion 844a of the terminal member 844 is exposed and formed on a bottom portion of the recessed portion 841a (see diagonal line part of FIG. 3). The dielectric 831 is housed so that the conductor layer 834 formed on the one surface 831a comes into contact with one end portion 844a of the terminal member 844 on the bottom portion of the recessed portion 841a. Therefore, in the state in which the dielectric 831 is housed and held in the recessed portion 841a, the conductor layer 834 as the first electrode of the pressure sensing portion 83 and the one end portion 844a of the terminal member 844 are brought into contact and electrically connected.

An end surface against which the projecting portion 833b of the conductive elastic member 833 is abutted is formed between the engagement protruding portions 841b and 841c of the holding portion 841 of the holder 84 of the pen pressure detection portion 81, and one end portion 843a of the terminal member 843 is exposed (see diagonal line part of FIG. 3). Therefore, in the state in which the conductive elastic member 833 is housed and held in the recessed portion 841a of the holder 84 along with the dielectric 831 and the spacer 832, the projecting portion 833b of the conductive elastic member 833 is abutted against the one end portion 843a of the terminal member 843, and the conductive elastic member 833 and the terminal member 843 are brought into contact and electrically connected.

In this way, the pressure sensing portion 83 is housed and held in the holding portion 841 of the holder 84 of the pen pressure detection portion 81, and the first electrode and the second electrode of the pressure sensing portion 83 are automatically and electrically connected to two terminal members 843 and 844 of the connection portion 842. Two terminal members 843 and 844 of the connection portion 842 of the holder 84 of the pen pressure detection portion 81 are electrically connected to the conduction patterns formed on the printed circuit board 10 housed in the board holder 9.

When the pen pressure transmission member 82 is combined with the holder 84 in the axial direction while the pressure sensing portion 83 is housed in the holding portion 841 of the holder 84, the pen pressure transmission member 82 and the holder 84 are combined together as illustrated in FIG. 2, and as a result, the pressure sensing portion 83 is held in the holding portion 841 of the holder 84. In this case, four engagement protruding portions 841b, 841c, 841d, and 841e of the holding portion 841 of the holder 84 are engaged with two engagement protrusions 823a and 823b of the pen pressure transmission member 82, and the pen pressure transmission member 82 is engaged with the holding portion 841 of the holder 84. As a result, the pen pressure transmission member 82 is locked to the holder 84, and the pen pressure transmission member 82 and the holder 84 are combined together.

In this way, in the state in which the pen pressure transmission member 82 is engaged and combined with the holder 84, the conductor layer 834 (first electrode) on one end surface of the dielectric 831 of the pressure sensing portion 83 is electrically connected to the one end portion 844a of the terminal member 844, and the projecting portion 833b of the conductive elastic member 833 (second electrode) is electrically connected to the one end portion 843a of the terminal member 843 in the holding portion 841 of the holder 84 of the pen pressure detection portion 81 as illustrated in FIG. 3.

When the pen pressure is applied to the core 3 while the pen pressure transmission member 82 is engaged and combined with the holder 84, the conductive elastic member 833 of the pressure sensing portion 83 is pressed by the pressing member 7 according to the applied pen pressure. Therefore, the conductive elastic member 833 and the dielectric 831 separated by the spacer 832 come into contact, and the contact area changes according to the pen pressure. The capacitance corresponding to the contact area of the conductive elastic member 833 and the dielectric 831 is obtained between the first electrode and the second electrode of the pressure sensing portion 83. That is, the pen pressure can be detected from the capacitance of the variable capacitor as the pressure sensing portion 83.

As described above, the pen pressure detection module 8 is fitted to the fitting portion 92 of the board holder 9. As a result, the pen pressure detection module 8 is electrically connected to the printed circuit board 10, and the pen pressure can be reported to the printed circuit board 10 side. Both ends of the coil 51 of the coil member 5 are also connected to the printed circuit board 10 to provide a resonant circuit along with the condenser 103 and the like.

Configuration of Main Parts of Pressure Detection Element

Figure 4A:
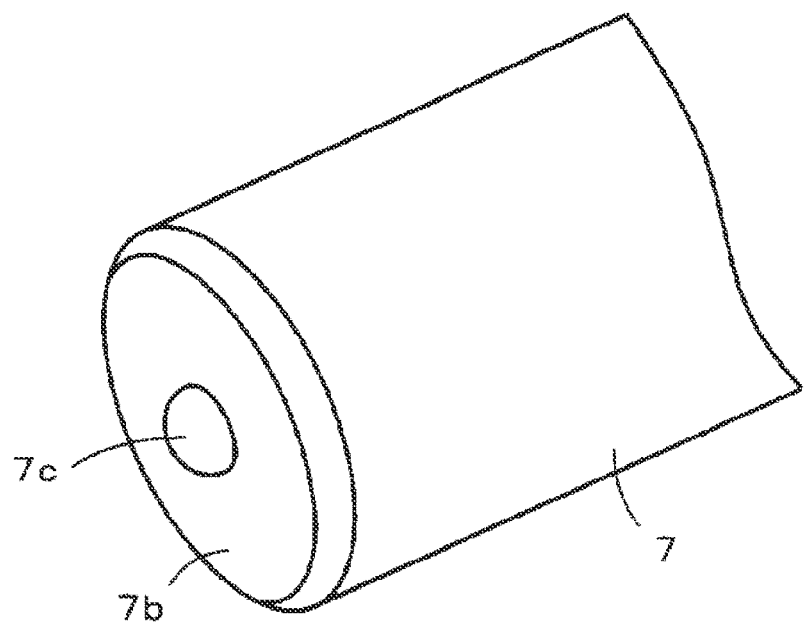
FIGS. 4A and 4B illustrate diagrams for describing a configuration example of a pressing member of the pressure detection element according to an embodiment of the disclosure.
Figure 4B:
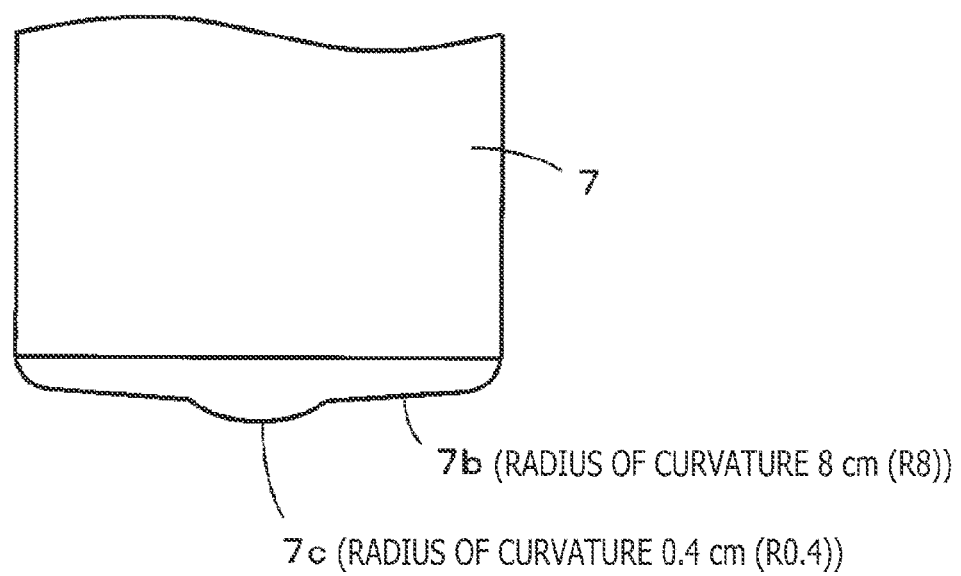

In the embodiment, the pressure sensing portion 83 and the pressing member 7 provide one pressure detection element. The configuration of the pressing member 7 is mainly devised to realize a pressure detection element with favorable on-load characteristics, response characteristics, and hysteresis characteristics. FIGS. 4A and 4B illustrate diagrams for describing a configuration example of the pressing member 7 according to the embodiment of the pressure detection element of the disclosure. FIG. 5 illustrates diagrams for describing a configuration example of main parts including the pressing member 7 according to the embodiment of the pressure detection element of the disclosure.

The pressing member 7 has a columnar shape including the fitting recessed hole 7a to which the core body portion 31 is fitted as illustrated in FIG. 2. The end surface on the opposite side of the end surface provided with the fitting recessed hole 7a of the pressing member 7 presses the conductive elastic member 833 of the pressure sensing portion 83. The end surface of the pressing member 7 that presses the conductive elastic member 833 is provided as a roundish flat surface 7b with predetermined curvature, with the apex at the center of the end surface as illustrated in FIG. 4A. A protrusion 7c is provided at the apex (center position) of the end surface 7b. More specifically, the end surface 7b of the pressing member 7 is formed as a gently roundish flat surface with a radius of curvature of, for example, 8 cm (R8) as illustrated in FIG. 4B. The protrusion 7c provided at the apex of the end surface 7b has a curved surface shape with a radius of curvature of, for example, 0.4 cm.

Figure 5A:
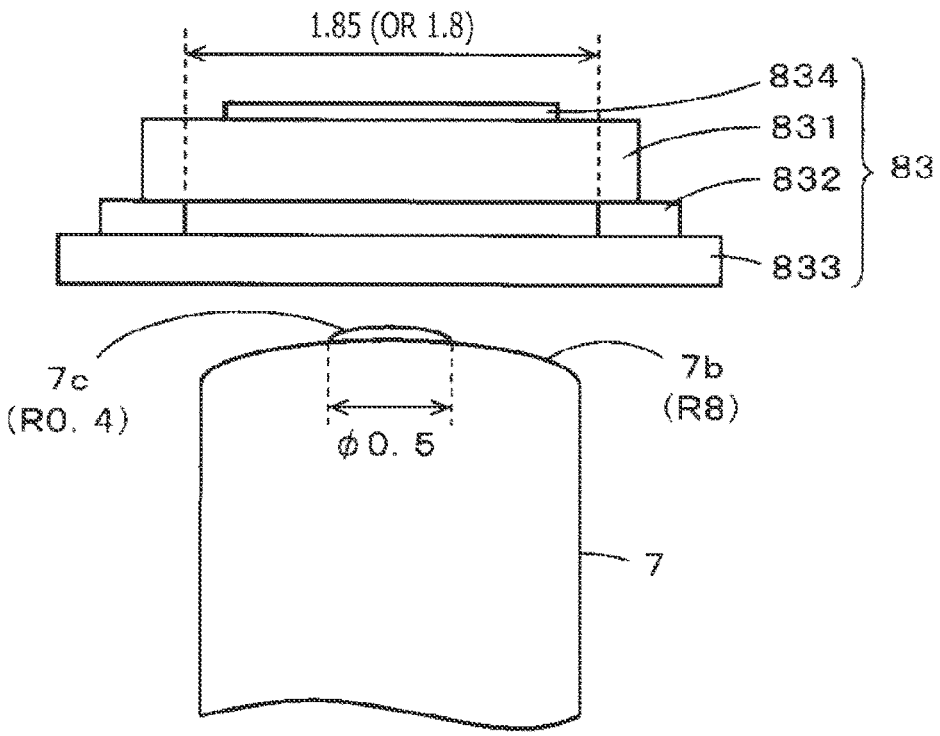
FIGS. 5A and 5B illustrate diagrams for describing a configuration example of main parts including the pressing member of the pressure detection element according to an embodiment of the disclosure.

As illustrated in FIG. 5A, the pressure sensing portion 83 is provided by stacking the conductive elastic member 833, the spacer 832, the dielectric 831, and the conductor layer 834 in this order from the bottom. When the pen pressure is applied to the core 3, the end surface 7b provided with the protrusion 7c of the pressing member 7 presses the conductive elastic member 833 of the pressure sensing portion 83.

In the embodiment, the spacer 832 has an inner diameter of 1.85 mm or 1.8 mm and a thickness of, for example, 40 μm (micrometer) as illustrated in FIG. 5A. The inner diameter of the spacer 832 is a little shorter than that of an existing spacer. The outer diameter of the pillar-shaped pressing member 7 is also substantially the same as or smaller than the inner diameter of the spacer 832. In this way, the pressing member 7 can press the conductive elastic member 833 in an appropriate range to bring the conductive elastic member 833 into contact with the dielectric 831 in an appropriate range.

As also illustrated in FIG. 5A, the end surface 7b is a roundish flat surface with a radius of curvature of R8, and the protrusion 7c has a spherical shape with a radius of curvature of R0.4. In the embodiment, an outer diameter of the protrusion 7c is, for example, 0.5 mm as illustrated in FIG. 5A.

When the pen pressure is applied to the core 3, the pressing member 7 moves toward the conductive elastic member 833 along with the core 3 because the core body portion 31 is fitted to the fitting recessed hole 7a. In this case, the protrusion 7c provided at the apex of the end surface 7b first pushes out the conductive elastic member 833 and brings the conductive elastic member 833 into contact with the dielectric 831. When a larger pen pressure is applied, the end surface 7b comes into contact and pushes out the conductive elastic member 833, and the conductive elastic member 833 comes into contact with the dielectric 831 in a wider area.

Therefore, the function of the protrusion 7c of the end surface 7b of the pressing member 7 can improve the on-load characteristics, detect even a little pen pressure, and transmit the pen pressure to the position detection apparatus 302. As a result, detailed indication and input, such as what is generally called tap operation and continuous tap operation, can be more surely performed.

Even when relatively large pen pressure is applied to the core 3, the end surface 7b comes into contact with the conductive elastic member 833 from near the protrusion 7c toward the outside. The end surface 7b pushes out the conductive elastic member 833 while expanding the contact area. As a result, the conductive elastic member 833 comes into contact with the surface 831b of the dielectric 831 from the center part toward the outside. The pen pressure applied to the core 3 can be detected according to the application state (degree) of the pen pressure, and the indication and input corresponding to the applied pen pressure can be performed.

It is assumed that the tip portion 32 of the core 3 of the electronic pen 1 is separated from the operation surface of the position detection apparatus to release the pen pressure applied to the core 3. When the pen pressure is a little pen pressure in a degree of what is generally called tap operation, just the protrusion 7c part of the end surface 7b of the pressing member 7 pushes out the conductive elastic member 833. Therefore, if the pen pressure is released, the conductive elastic member 833 can quickly be returned to the initial state.

When the pen pressure applied to the core 3 is larger than the degree of the tap operation, the contact area of the conductive elastic member 833 and the end surface 7b also becomes large, and restoring force of the conductive elastic member 833 is exerted at the contact area. Therefore, when the applied pen pressure is large, large restoring force can be obtained, and the initial state can quickly be restored. In this way, when the pen pressure applied to the core 3 is released, the conductive elastic member 833 can quickly be returned to the initial state, and the response characteristics can be favorable.

When the pen pressure is applied to the core 3, the protrusion 7c pushes out the conductive elastic member 833, and then the end surface 7b comes into contact and pushes out the conductive elastic member 833 as also described above. This gradually expands the contact area of the conductive elastic member 833 and the dielectric 831. Therefore, the capacitance between the conductor layer 834 and the conductive elastic member 833 changes according to the application condition of the pen pressure, and the pen pressure can be detected according to the condition of the application of the pen pressure.

When the pen pressure applied to the core 3 is released, the contact of the conductive elastic member 833 and the end surface 7b is released from the outside of the end surface 7b toward inside. Accordingly, the contact of the dielectric 831 and the conductive elastic member 833 is also gradually released from the outside toward the inside, and the pen pressure in the direction of the release can be detected according to the condition of the release. Therefore, there is a resemblance between the hysteresis during the application of the pen pressure and the hysteresis during the release of the pen pressure, and the hysteresis characteristics can also be favorable.

Figure 5B:
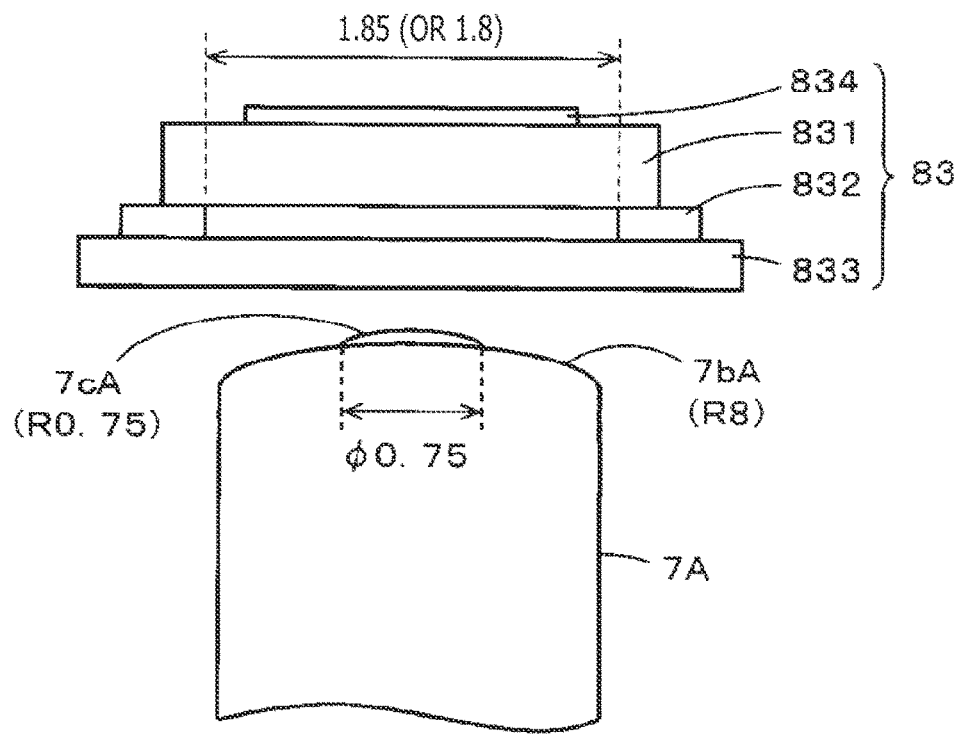
Figure 6A:
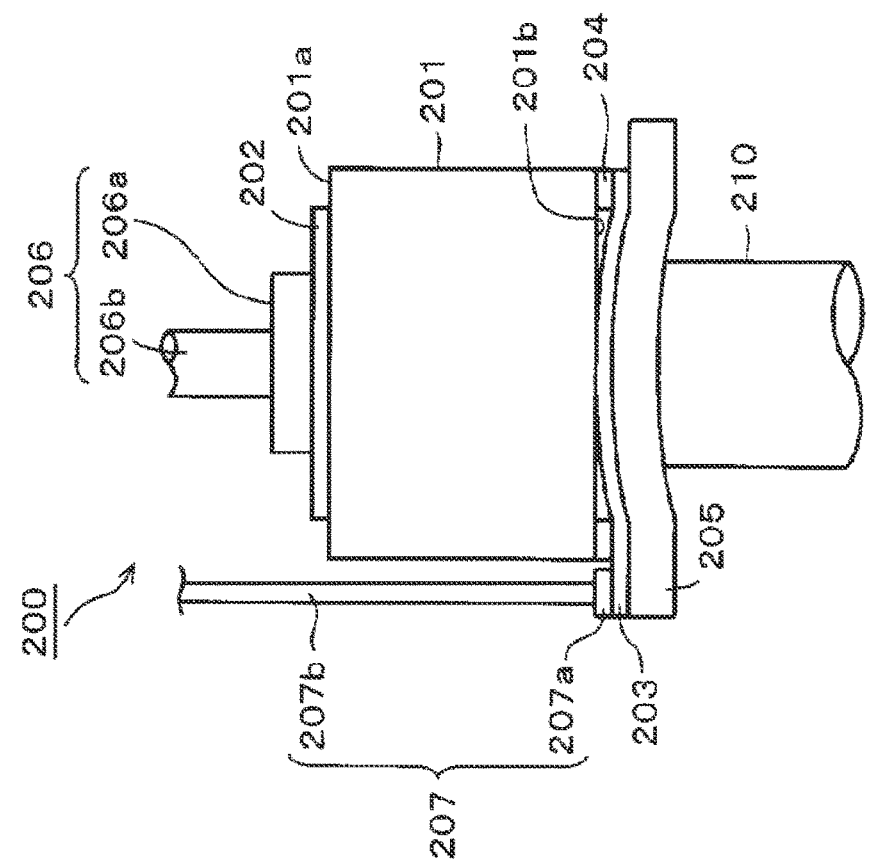
FIGS. 6A and 6B illustrates diagrams for describing a configuration example of an existing pressure detection element.
Figure 6B:
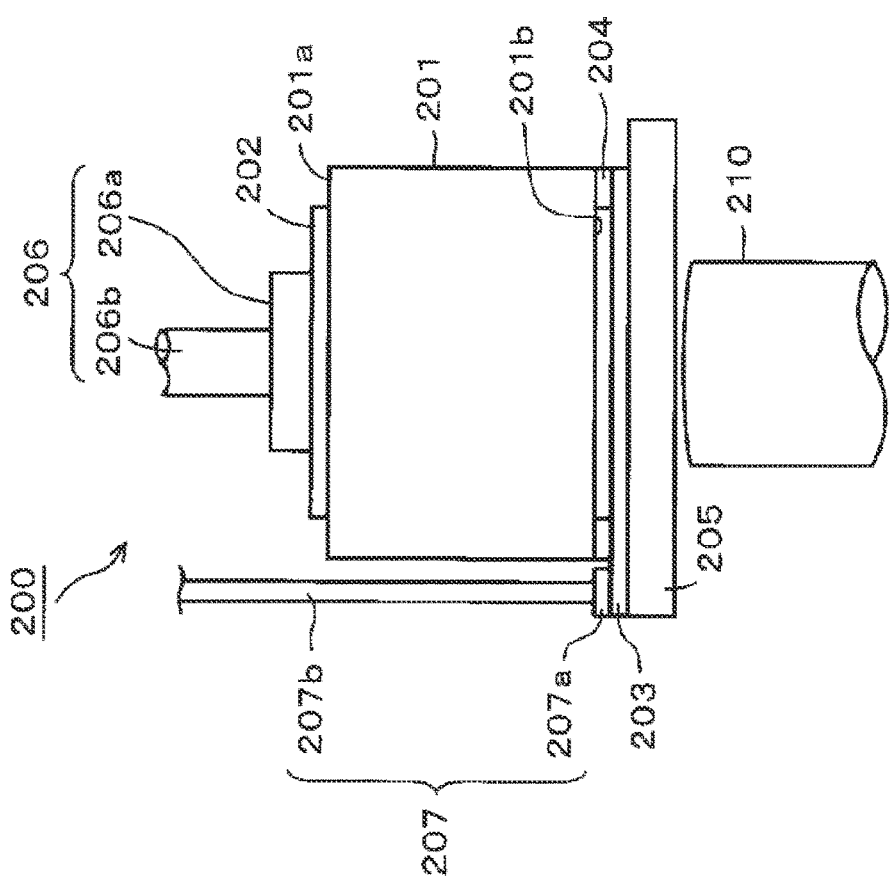
Figure 7A:
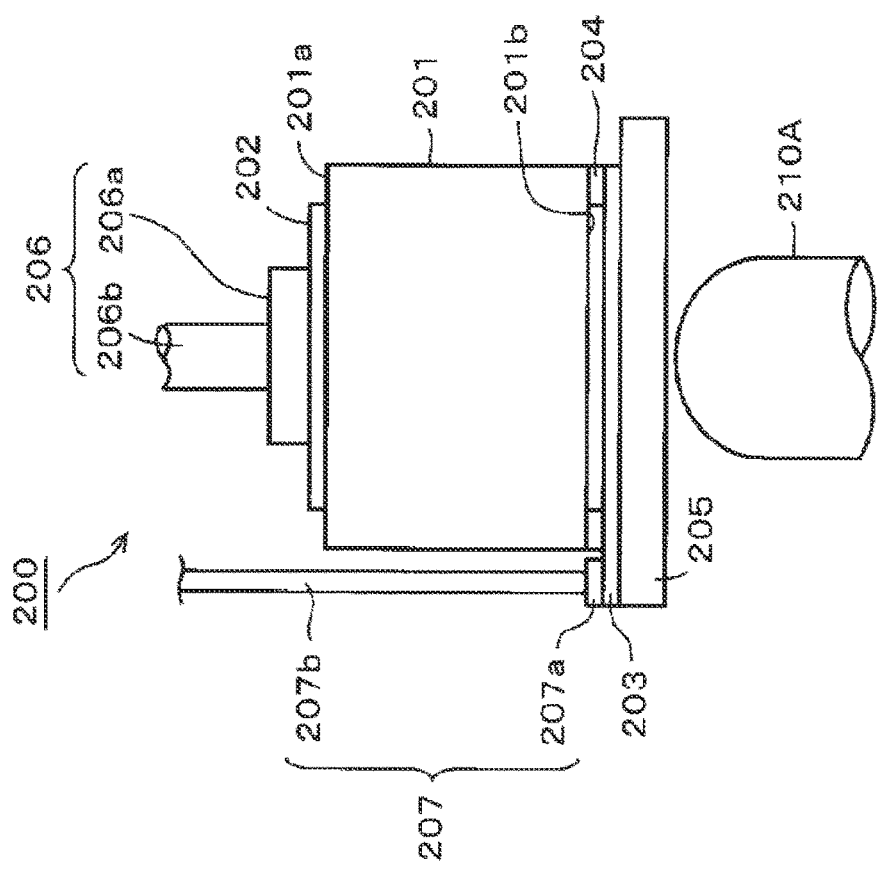
FIGS. 7A and 7B illustrate diagrams for describing a configuration example of the pressure detection element shown in FIGS. 6A and 6B with different shapes of a core as a pressing member.
Figure 7B:
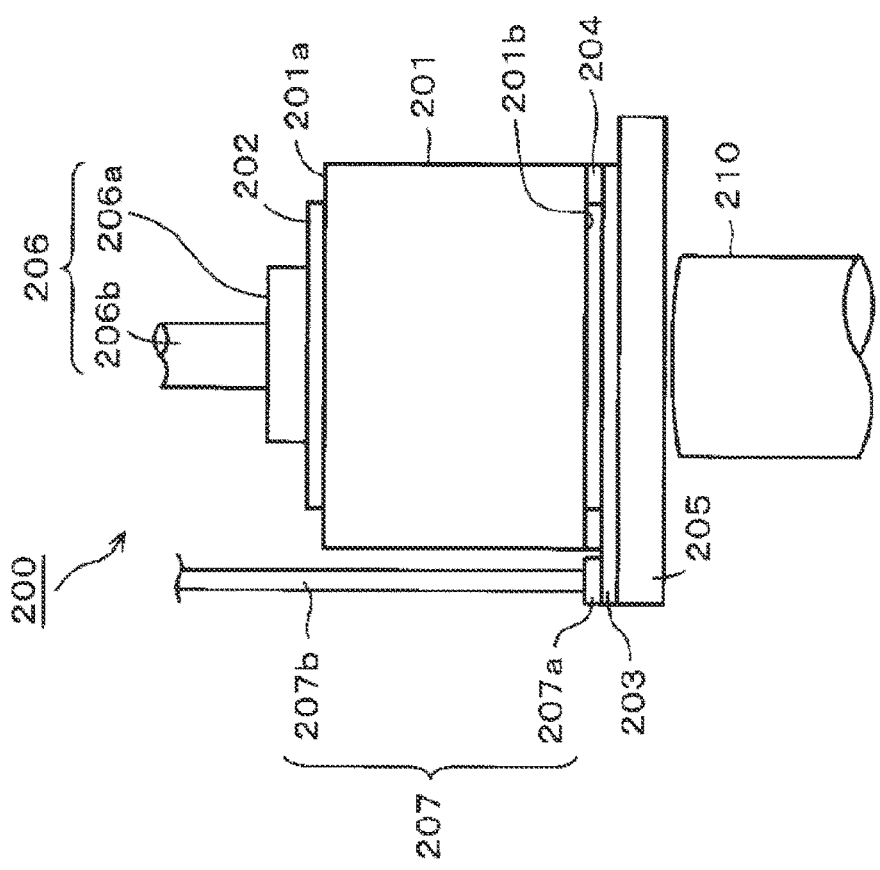

Note that as illustrated in FIG. 5B, a protrusion 7cA with a radius of curvature of 0.75 mm may be provided at the apex of the end surface 7b instead of the protrusion 7c with a radius of curvature of R0.4. The roundness of the protrusion 7cA is gentler than the roundness of the protrusion 7c, and the amount of projection is also small. Therefore, an adjustment can be made to reduce the on-load characteristics. In this way, various values can be set for the radius of curvature and the amount of projection of the protrusion formed at the apex of the end surface 7b. Various values can also be set for the radius of curvature of the end surface 7b. The radius of curvature of the end surface 7b can be, for example, an appropriate value longer than R4 (radius of curvature of 4 cm).

Another Embodiment

The material of the pressing member 7 and the material of the protrusions 7c and 7cA are the same in the embodiment. However, the materials may be different. Specifically, the pressing member 7 is made of a hard polyoxymethylene (POM) material, and the protrusions 7c and 7cA are made of a material softer than the POM material. If the protrusion portion is soft, the protrusion portion is elastically deformed to push the conductive elastic member into the dielectric when the pen pressure is applied to the pressing member through the core 3 to push the pressing member into the conductive elastic member 833. When the pen pressure is released, the restoring force of the protrusion portions is also added to the restoring force of the conductive elastic member. This improves the response characteristics compared to when the members are the same. Note that the protrusion formed at the apex of the pressing member 7 may not have curvature, and the protrusion may be in various shapes, such as a columnar shape and a prismatic shape.

Advantageous Effect of Embodiment

In the pressure detection element of the embodiment, the end surface 7b of the pressing member 7 is a roundish flat surface with predetermined curvature, and the protrusion 7c is provided at the apex of the surface. According to the configuration, all of the on-load characteristics, the response characteristics, and the hysteresis characteristics can be favorable. As a result, a detailed operation, such as a tap operation and repetitions of the tap operation, can appropriately be detected and reported to the position detection apparatus. Therefore, more detailed indication and input can appropriately be performed than in the past, and processes executed by processing apparatuses with increasing precision can sufficiently be handled.

Modifications

Note that although the example of applying the pressure detection element according to the disclosure to the electronic pen of the electro magnetic resonance system has been described in the embodiment, the example is not limited to this. The pressure detection element of the disclosure can also be applied to an electronic pen of the active capacitive coupling system. That is, the pressure detection element according to the embodiment is suitable for use in detecting minute pressure, such as pen pressure applied to the nib, and pressure continuously changing from minute pressure to relatively large pressure.

Various changes can also be made to the inner diameter and the thickness of the spacer 832, and various changes can also be made to the outer diameter and the thickness of the dielectric.

In recent years, the electronic pens have waterproof functions in some cases. In the embodiment, the cap member 4 and the sealing member 93 provide a waterproof function at the part where the pen pressure detection module 8 is arranged. To provide a stronger waterproof function, a waterproof sheet formed by an elastic material may be provided on the back end side of the pen pressure transmission member 82 of the pen pressure detection module 8 illustrated in FIG. 3. Even when the waterproof sheet is provided, the pressing member can press the conductive elastic member 833 through the water proof sheet. Therefore, an electronic pen with a high-precision waterproof function can be realized without degrading the on-load characteristics, the response characteristics, and the hysteresis characteristics.

It is to be noted that the embodiments of the present disclosure are not limited to the foregoing embodiment, and that various changes can be made without departing from the spirit of the present disclosure.

What is claimed is:

1. A pressure detection element of a capacitive system, the pressure detection element comprising:
    a dielectric having two opposing surfaces including a first surface and a second surface;
    a conductor layer provided on the first surface of the dielectric;
    a conductive elastic member provided on the second surface of the dielectric;
    a spacer that positions the conductive elastic member at a predetermined distance from the second surface of the dielectric; and
    a pressing member configured to push the conductive elastic member toward the dielectric,
    wherein an end surface of the pressing member that presses the conductive elastic member has a predetermined curvature, with an apex at a center of the end surface, and
    wherein a protrusion is provided at the apex at the center of the end surface of the pressing member.

2. The pressure detection element according to claim 1, wherein:
    the protrusion of the pressing member includes a curved surface having a curvature that is greater than the curvature of the end surface provided with the protrusion.

3. The pressure detection element according to claim 1, wherein:
    a material of the pressing member and a material of the protrusion are different.

4. The pressure detection element according to claim 3, wherein:
    the material of the protrusion is softer than the material of the pressing member.

5. The pressure detection element according to claim 1, wherein:
    a radius of curvature of the end surface of the pressing member that presses the conductive elastic member is greater than 4 cm.

6. The pressure detection element according to claim 1, wherein:
    the spacer has an annular shape, and the pressing member has a columnar shape with an outer diameter that is less than an inner diameter of the spacer.

7. The pressure detection element according to claim 1, wherein:
   the spacer has an annular shape, and
   the pressing member has a columnar shape with an outer diameter of a same length as an inner diameter of the spacer.

8. The pressure detection element according to claim 1, wherein:
   a core of an electronic pen is connected to the pressing member to detect pen pressure applied to the core.

* * * * *